US009507351B2

(12) United States Patent
Kehoe et al.

(10) Patent No.: US 9,507,351 B2
(45) Date of Patent: Nov. 29, 2016

(54) SYSTEM AND METHOD FOR REDUCING FLOW PERTURBATIONS AND IMPROVING THE ACCURACY OF A RATE OF DECAY MEASUREMENT IN A MASS FLOW CONTROLLER

(71) Applicant: Illinois Tool Works Inc., Glenview, IL (US)

(72) Inventors: Anthony Kehoe, Glenview, IL (US); John Lull, Glenview, IL (US); Bill Valentine, Glenview, IL (US); Chris Ellec, Glenview, IL (US); Berwin Banares, Glenview, IL (US)

(73) Assignee: Illinois Tool Works Inc., Glenview, IL (US)

( * ) Notice: Subject to any disclaimer, the term of this patent is extended or adjusted under 35 U.S.C. 154(b) by 64 days.

(21) Appl. No.: 14/378,552

(22) PCT Filed: Mar. 4, 2013

(86) PCT No.: PCT/US2013/028901
§ 371 (c)(1),
(2) Date: Aug. 13, 2014

(87) PCT Pub. No.: WO2013/134140
PCT Pub. Date: Sep. 12, 2013

(65) Prior Publication Data
US 2015/0212524 A1 Jul. 30, 2015

Related U.S. Application Data

(60) Provisional application No. 61/608,009, filed on Mar. 7, 2012.

(51) Int. Cl.
*G05D 7/06* (2006.01)

(52) U.S. Cl.
CPC ........ *G05D 7/0635* (2013.01); *Y10T 137/0402* (2015.04); *Y10T 137/7761* (2015.04)

(58) Field of Classification Search
CPC ..... F17D 5/00; G05D 7/0635; G01F 15/005; G01F 1/6965; G01F 1/36; G01F 1/6847; G01F 1/88; Y10T 137/7784; Y10T 137/0402; Y10T 137/8175; Y10T 137/7761; Y10T 137/7758; Y10T 137/776; Y10T 137/7759
USPC ......... 137/487.5, 485, 487, 497, 552, 15.01; 73/202, 861.52, 715, 716, 721, 727, 73/736
See application file for complete search history.

(56) References Cited

U.S. PATENT DOCUMENTS

| 3,688,800 | A | 9/1972 | Hayner et al. |
| 4,928,524 | A * | 5/1990 | Sugi ........................ G01F 15/08 73/114.01 |

(Continued)

OTHER PUBLICATIONS

International Search Report and Written Opinion date mailed May 23, 2013 for International PCT Application PCT/US2013/028901.

*Primary Examiner* — Michael R Reid
(74) *Attorney, Agent, or Firm* — McGuireWoods, LLP

(57) ABSTRACT

A mass flow controller includes a fluid inlet, a fluid outlet, and a conduit defining a flow path along which the fluid flows through the mass flow controller. The mass flow controller includes an inlet block having an inlet aperture, an inlet channel fluidly coupled to the conduit, and one or more restrictors positioned along the flow path between the inlet aperture and inlet channel to minimize flow perturbations when a rate of decay measurement is taken or when flow the amount of pressure supplied to the valve inlet is otherwise interrupted.

17 Claims, 7 Drawing Sheets

(56) References Cited

U.S. PATENT DOCUMENTS

| | | | | |
|---|---|---|---|---|
| 4,958,658 A | * | 9/1990 | Zajac | F17D 1/20 137/565.34 |
| 5,159,951 A | | 11/1992 | Ono et al. | |
| 5,220,830 A | * | 6/1993 | Bonne | G01F 1/684 73/198 |
| 5,975,126 A | | 11/1999 | Bump et al. | |
| 7,874,208 B2 | | 1/2011 | Redemann et al. | |
| 2002/0050299 A1 | | 5/2002 | Nguyen | |
| 2002/0179150 A1 | | 12/2002 | Balazy et al. | |
| 2011/0011183 A1 | | 1/2011 | Monkowski et al. | |

* cited by examiner

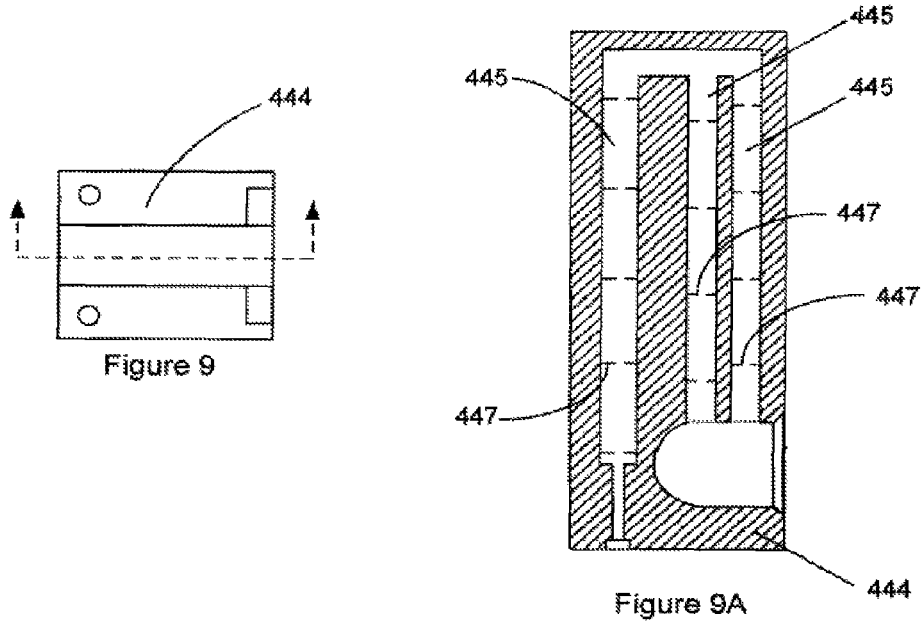
Figure 9
Figure 9A
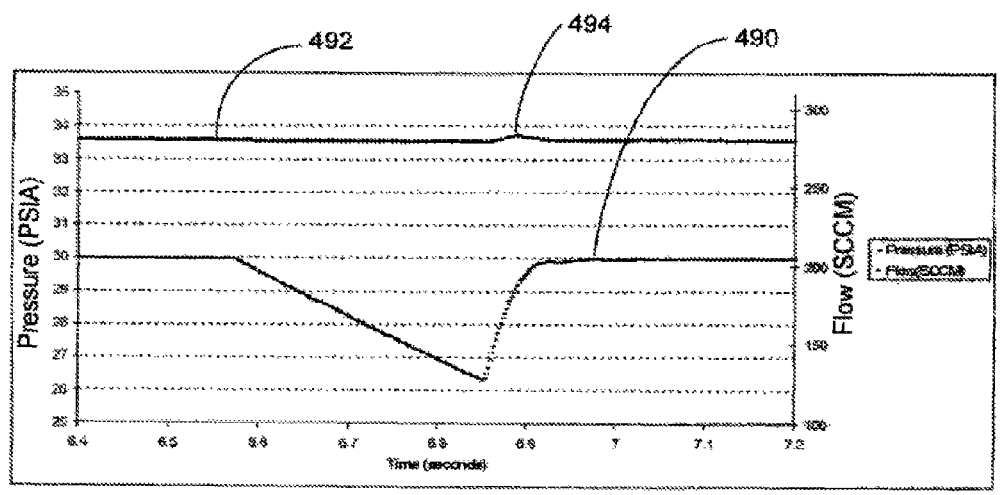
Figure 10

SYSTEM AND METHOD FOR REDUCING FLOW PERTURBATIONS AND IMPROVING THE ACCURACY OF A RATE OF DECAY MEASUREMENT IN A MASS FLOW CONTROLLER

BACKGROUND OF THE INVENTION

1. Field of the Invention

The present invention relates generally to methods and systems for determining the mass flow rate of a fluid, and more particularly to the operation of mass flow controllers.

2. Discussion of the Related Art

Many industrial processes require precise control of various process fluids. For example, in the semiconductor industries, mass flow controllers are used to precisely measure and control the amount of a process fluid that is introduced to a process chamber. The term fluid is used herein to describe any type of matter in any state that is capable of flow. It is to be understood that the term fluid applies to compressible fluids, such as gases and vapors, to which controlled flow may be of interest.

Rate of Decay (ROD) measurements are a known method used to calibrate a variety of flow measurement devices including those utilized in mass flow controllers.

The disclosed embodiments include a system and method for improving a mass flow controller by modifying an inlet block of a mass flow controller to reduce the flow perturbations when making the ROD measurement.

SUMMARY

According to an illustrative embodiment, a system for determining a flow rate of a compressible fluid includes at least one conduit having a fluid inlet and a fluid outlet. The conduit defines a flow path along which the fluid flows. The system also includes an inlet block having inlet aperture, one or more restrictors coupled to the inlet aperture, and an inlet channel fluidly coupled to the conduit. The restrictors are sized and configured to prevent pressure perturbations of a magnitude that will interfere with the performance of a flow sensor. In addition, the system includes a pressure sensor that generates a pressure signal, which is indicative of the pressure of the fluid in the conduit. The pressure sensor is coupled to a controller that is operable to pressure sensor based pressure measurement. The flow sensor generates a flow sensor signal, which is proportional to the mass flow rate of the fluid through the conduit, and the flow sensor is coupled to a controller that is operable to generate a flow sensor based mass flow rate for the fluid, which is determined at least in part from the flow sensor signal.

According to another illustrative embodiment, a method of manufacturing a mass flow controller includes providing a block to secure components of the mass flow controller and forming at least one conduit comprising a fluid inlet and a fluid outlet to define a fluid flow path. The restrictors are sized and configured to prevent pressure perturbations of a magnitude that will interfere with the performance of a flow sensor when fluid flow into the system resumes after a rate of decay measurement. The method also includes providing an inlet block having an inlet aperture, one or more restrictors, and an inlet channel fluidly coupled to the conduit. In addition, the method includes providing at least one flow sensor that generates a flow sensor signal proportional to the mass flow rate of fluid through the conduit, and a pressure sensor that generates a signal indicative of the pressure in the conduit. The at least one flow sensor is coupled to a control subsystem that is operable to receive the flow sensor signal and generate a flow sensor based mass flow rate for the fluid, and the pressure sensor is coupled to the control system, which is operable to receive the pressure sensor signal to generate a pressure measurement. Further, a valve assembly is coupled to the block and a communicative coupling is established between the control subsystem and the valve body. The control subsystem is operable to control the valve assembly to adjust the rate of fluid through the conduit.

According to another embodiment, a mass flow controller includes at least one conduit having a fluid inlet and a fluid outlet. The conduit defines a flow path along which the fluid flows through the mass flow controller. The mass flow controller includes an inlet block having an inlet aperture, an inlet channel fluidly coupled to the conduit, and one or more restrictors positioned along the flow path between the inlet aperture and inlet channel. The one or more restrictors are sized and configured to prevent pressure perturbations of a magnitude that will interrupt the performance of a flow sensor when fluid flow into the system resumes after a rate of decay measurement. As such, the mass flow controller includes at least one flow sensor that generates a flow sensor signal that is proportional to a mass flow rate of the fluid through the conduit. The at least one flow sensor is coupled to a controller that is operable to generate a flow sensor based mass flow rate for the fluid, and the flow sensor based mass flow rate is determined at least in part from the flow sensor signal. The mass flow controller also includes a pressure sensor that generates a pressure sensor signal, which is indicative of the pressure of the fluid through the conduit. The at least one pressure sensor is coupled to the controller, which is operable to generate a pressure sensor based pressure measurement for the fluid. In addition, the mass flow controller includes a control subsystem coupled to the at least one flow sensor and a valve assembly communicatively coupled to the control subsystem and operable to adjust the rate of fluid through the conduit.

BRIEF DESCRIPTION OF THE DRAWINGS

Illustrative embodiments of the present invention are described in detail below with reference to the attached drawing figures, which are incorporated by reference herein and wherein:

FIG. 9 is a section view of an inlet block that is similar in structure to the inlet block of FIG. 6 showing an alternative type of restrictor;

FIG. 10 is a graph illustrating an example response when the pressure restored to a mass flow controller utilizing an inlet block having one or more restrictors after a ROD measurement in accordance with the disclosed embodiments.

DETAILED DESCRIPTION

The disclosed embodiments include a system and method for improving a mass flow controller by modifying an inlet block of a mass flow controller to reduce the flow perturbations when making the ROD measurement.

The disclosed embodiments and advantages thereof are best understood by referring to FIGS. 1-7 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages will be included within the scope of the disclosed embodiments. Further, the illustrated figures are only exemplary and are not intended to assert or imply any limitation with regard to the environment, architecture, design, or process in which different embodiments may be implemented.

Figure 1:
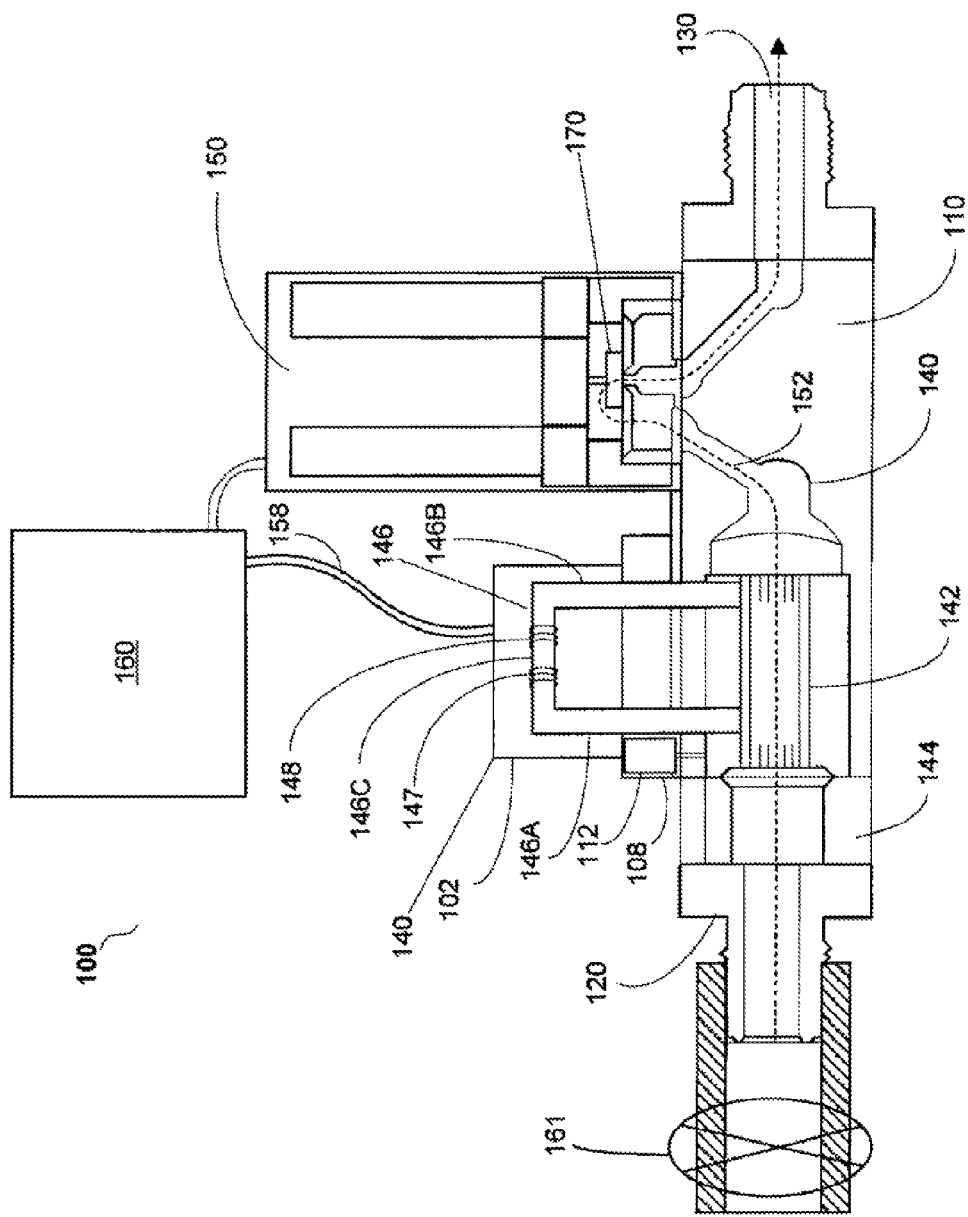
FIG. 1 is a schematic section view of an embodiment of a current mass flow controller.

FIG. 1 shows schematically a typical mass flow controller 100 that includes a block 110, which is the platform on which the components of the mass flow controller are mounted. A thermal mass flow meter 140 and a valve assembly 150 containing a valve 170 are mounted on the block 110 between a fluid inlet 120 and a fluid outlet 130. The thermal mass flow meter 140 includes an inlet block 144 that couples the fluid inlet 120 to a bypass 142 through which typically a majority of fluid flows and a thermal flow sensor 146 through which a smaller portion of the fluid flows.

Thermal flow sensor 146 is contained within a sensor housing 102 (portion shown removed to show sensor 146) mounted on a mounting plate or sensor base 108. Sensor 146 is a small diameter tube, typically referred to as a capillary tube, with a sensor inlet portion 146A, a sensor outlet portion 146B, and a sensor measuring portion 146C about which two resistive coils or windings 147, 148 are disposed. In operation, electrical current is provided to the two resistive windings 147, 148, which are in thermal contact with the sensor measuring portion 146C. The current in the resistive windings 147, 148 heats the fluid flowing in measuring portion 146 to a temperature above that of the fluid flowing through the bypass 142. The resistance of windings 147, 148 varies with temperature. As fluid flows through the sensor conduit, heat is carried from the upstream resistive winding 147 toward the downstream resistive winding 148, with the temperature difference being proportional to the mass flow rate through the sensor.

An electrical signal related to the fluid flow through the sensor is derived from the two resistive windings 147,148. The electrical signal may be derived in a number of different ways, such as from the difference in the resistance of the resistive windings or from a difference in the amount of energy provided to each resistive winding to maintain each winding at a particular temperature. Examples of various ways in which an electrical signal correlating to the flow rate of a fluid in a thermal mass flow meter may be determined are described, for example, in commonly owned U.S. Pat. No. 6,845,659, which is hereby incorporated by reference. The electrical signals derived from the resistive windings 147,148 after signal processing comprise a sensor output signal.

The sensor output signal is correlated to mass flow in the mass flow meter so that the fluid flow can be determined when the electrical signal is measured. The sensor output signal is typically first correlated to the flow in sensor 146, which is then correlated to the mass flow in the bypass 142, so that the total flow through the flow meter can be determined and the control valve 170 can be controlled accordingly. The correlation between the sensor output signal and the fluid flow is complex and depends on a number of operating conditions including fluid species, flow rate, inlet and/or outlet pressure, temperature, etc.

The process of correlating raw sensor output to fluid flow entails tuning and/or calibrating the mass flow controller 100 and is an expensive, labor intensive procedure, often requiring one or more skilled operators and specialized equipment. For example, the mass flow meter 140 may be tuned by running known amounts of a known fluid through a flow sensor, such as, for example, thermal sensor portion 146 and adjusting certain signal processing parameters to provide a response that accurately represents fluid flow. The output may be normalized, so that a specified voltage range, such as 0 V to 5 V of the sensor output, corresponds to a flow rate range from zero to the top of the range for the sensor. The output may also be linearized, so that a change in the sensor output corresponds linearly to a change in flow rate. For example, doubling of the fluid output will cause a doubling of the electrical output if the output is linearized. The dynamic response of the sensor is determined, that is, inaccurate effects of change in pressure or flow rate that occur when the flow or pressure changes are determined so that such effects can be compensated.

The bypass 142 may be coupled to the sensor 146 and tuned with the known fluid to determine an appropriate relationship between fluid flowing in the mass flow meter 140 and the fluid flowing in the bypass 142 at various known flow rates, so that the total flow through the flow meter can be determined from the sensor output signal. In some mass flow controllers, no bypass is used, and the entire flow passes through the thermal sensor 146. The mass flow sensor 146 portion and bypass 142 may then be mated to the base 110 of the mass flow controller 100 with the control valve 170 and control electronics 160 portions and then tuned again, under known conditions. The responses of the control electronics 160 and the control valve 170 are then characterized so that the overall response of the system to a change in set point or input pressure is known, and the response can be used to control the system to provide the desired response.

When the type of fluid used by an end-user differs from that used in tuning and/or calibration, or when the operating conditions, such as inlet and outlet pressure, temperature, and range of flow rates, used by the end-user differ from that used in tuning or calibration, the operation of the mass flow controller 100 is generally degraded. For this reason, the flow meter 140 can be tuned or calibrated using additional fluids (termed "surrogate fluids") and or operating conditions, with any changes necessary to provide a satisfactory response being stored in a lookup table. U.S. Pat. No. 7,272,512 to Wang et al., for "Flow Sensor Signal Conversion," which is owned by the assignee of the present invention and which is hereby incorporated by reference, describes a system in which the characteristics of different gases are used to adjust the response, rather than requiring a surrogate fluid to calibrate the device for each different process fluid used.

Control electronics 160 control the position of the control valve 170 in accordance with a set point that corresponds to the desired mass flow rate, and an electrical flow signal from the mass flow sensor 146 indicative of the actual mass flow rate of the fluid flowing in the sensor conduit. Traditional feedback control methods such as proportional control, integral control, proportional-integral (PI) control, derivative control, proportional-derivative (PD) control, integral-derivative (ID) control, and proportional-integral-derivative (PID) control are then used to control the flow of fluid in the mass flow controller. A control signal (e.g., a control valve drive signal) is generated based upon an error signal that is the difference between a set point signal indicative of the desired mass flow rate of the fluid and a feedback signal that is related to the actual mass flow rate sensed by the mass flow sensor 146. The control valve 170 is positioned in a main fluid flow path 152 (typically downstream of the bypass 142 and mass flow sensor 146) and can be controlled (e.g., opened or closed) to vary the mass flow rate of fluid flowing through the main fluid flow path 152, the control being provided by the mass flow controller 100.

In the illustrated example, the flow rate is supplied by electrical conductors 158 to a closed loop system controller 160 as a voltage signal. The signal is amplified, processed and supplied to the control valve assembly 150 to modify the flow. To this end, the controller 160 compares the signal from the mass flow meter 140 to predetermined values and adjusts the control valve 170 accordingly to achieve the desired flow.

The control valve 170 is positioned in the main fluid flow path (typically downstream of the bypass 142 and thermal mass flow meter 146) and can be controlled (e.g., opened or closed) to vary the mass flow rate of fluid flowing through the main fluid flow path and provided by the mass flow controller through the outlet 180. The valve is typically controlled by a valve actuator, examples of which include solenoid actuators, piezoelectric actuators, stepper actuators, etc.

In an embodiment, the mass flow controller 100 includes a pressure sensor 112, which may be a pressure transducer coupled to flow path at some point, typically, but not limited to, upstream of the bypass 142 to measure pressure in the flow path. Pressure sensor 112 provides a pressure signal indicative of the pressure.

Controller 160 includes control electronics to control the position of the control valve 170 based upon a set point that is indicative of the mass flow rate of fluid that is desired to be provided by the mass flow controller, and a flow signal from the thermal mass flow meter 146 indicative of the actual mass flow rate of the fluid flowing in the sensor conduit.

As stated above, Rate of Decay (ROD) measurements may be used to calibrate a variety of flow measurement devices including those utilized in the mass flow controller 100 illustrated in FIG. 1. Typically, when an ROD measurement is conducted, the mass flow controller 100 shuts off an upstream isolation valve 161 to isolate the mass flow controller 100 at the fluid inlet 120. After the mass flow controller 100 is isolated, the ROD can be determined by using the pressure sensor 112 to measure the pressure decay in the internal volume that is upstream of the control valve 170. It is recognized that the amount of gas available in the closed volume of the conduit 154 upstream of the control valve 170 directly controls the amount of time that is available for a pressure decay measurement because a greater volume of fluid will take a longer time to dissipate through a given flow path at a given pressure.

When the ROD measurement is complete, the upstream isolation valve (not shown) must be reopened to allow the inlet pressure to be restored and the flow to continue if needed. Depending on the amount of pressure decay during the measurement, the amount of sudden pressure increase will ripple through the gas line and cause the flow to suddenly change while the control system tries to adjust.

Figure 2:
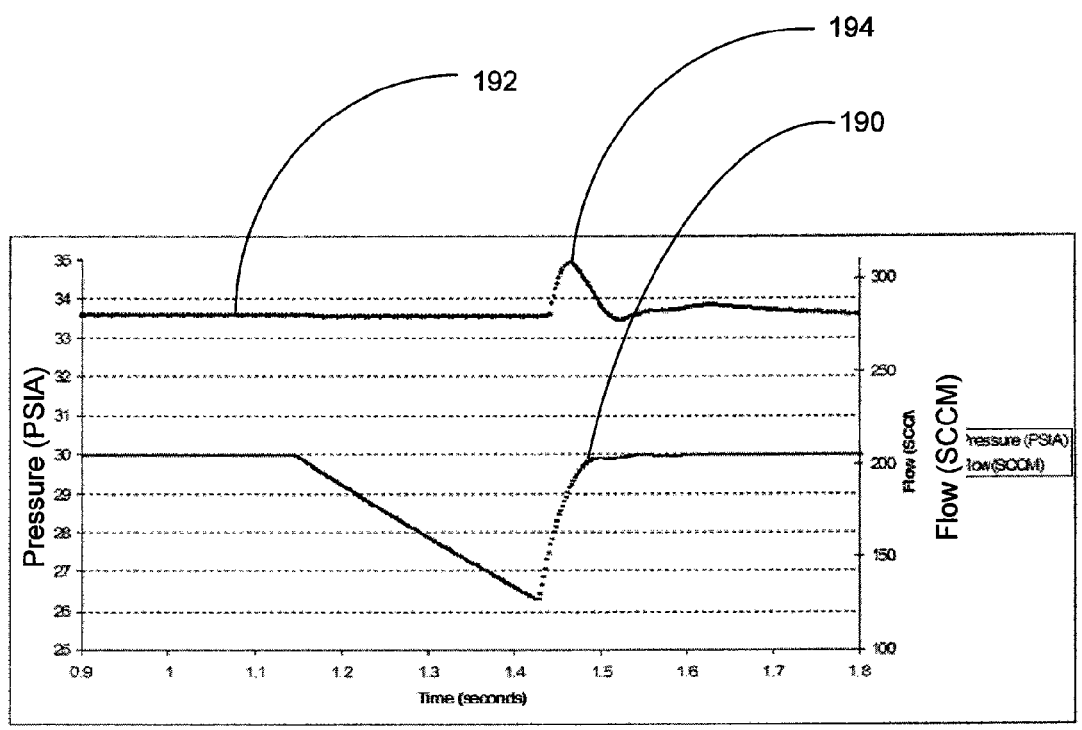
FIG. 2 is a graph illustrating a typical response of a mass flow controller when the pressure is suddenly restored after a ROD measurement.

FIG. 2 is a graph illustrating a typical response of a mass flow controller when the pressure is suddenly restored after a ROD measurement. Typical Pressure Transient Insensitive (PTI) algorithms contemplate modest rates of pressure change, on the order of 5-10 psi/sec. These PTI algorithms are derived to account for the "false flow" that occurs because of the filling or discharging effect that a pressure increase or decrease (respectively) has on the volume of the flow conduit 354 between the outlet of the sensor 346 and the valve 370. For example, consider a mass flow controller that contains nitrogen gas at 25 psia, a closed valve with no leakage, a volume of 2 $cm^3$ between the sensor 346 and the valve 370, a gas temperature of 20° C., and a 5 psi pressure increase over a period of one second. Applying the ideal gas law, the mass that will flow into the reservoir in one second as a result of a pressure change is:

$$\Delta M = \Delta P V / R_{gas} Temp \quad \text{(Equation 1)}$$

where:

$\Delta M$ is the mass that flows into the conduit 354 in one second, $\Delta P$ is the pressure change in one second=5 psi, V is the volume of conduit 354=2 cm^3, and Temp is the gas temperature of 20° C.

Substituting the above values into Equation 1 and performing the calculation results in a mass flow rate of 0.048 g/min or 38 sccm when converted into a gas volumetric flow rate at standard density per SEMI Specification E12-96. This is a false flow term, which, if not accounted for, will result in an inaccurate delivery of flow.

Conversely, the pressure increase that results at the end of the ROD measurement in FIG. 2 is ~80 psi/sec (4 psi spike/0.05 seconds=80 psi/sec). In addition to inducing a false flow term as described above, large ROD pressure recovery spikes can cause two additional mass flow controller control issues which typical PTI algorithms may not handle. First, the system may not be able to respond fast enough to compensate for the pressure pulse, which would result in an excessively large flow perturbation at the end of the ROD measurement. For the example, in FIG. 2, a flow perturbation of ~30 sccm (or 10% of setpoint) is introduced at the end of the ROD measurement. Such a large flow perturbation could be damaging to the manufacturing process for which the mass flow controller is used (for example, a chemical vapor deposition process). Second, a large pressure pulse may saturate the thermal sensor and thereby render the sensor unable to make accurate flow measurements for several seconds. This would result in large flow perturbations that could also be damaging to the customer's process.

FIG. 2 illustrates such a flow perturbation. In FIG. 2, a first trend line 190 tracks the pressure over time to indicate the rate of pressure drop during a rate of decay measurement. Over the same time period, a second trend line 192 tracks the change in flow through the mass flow meter. As shown in FIG. 2, the pressure rapidly turns to a baseline of 30 psi at a time of approximately 1.42 seconds. Almost immediately afterward, a significant flow perturbation 194 is measured. Thus, FIG. 2 illustrates that the drop and subsequent sudden increase in pressure that occur when a ROD measurement is performed may result in undesirable flow perturbations.

In order to overcome the above-mentioned problems associated with current mass flow controllers, the disclosed embodiments include a system and method for improving a mass flow controller by modifying an inlet block of a mass flow controller to reduce the flow perturbations when making the ROD measurement. The disclosed embodiments may also provide for an increased volume of fluid to reside in the flow path 152 upstream of the valve 170, which can be made available to make the ROD measurement to increase the duration of pressure decay and provide for the ROD measurement to be taken at greater flow rates.

Figure 3:
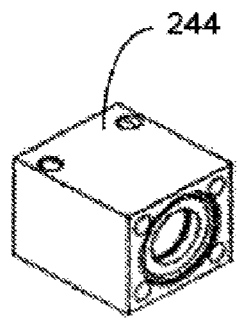
FIG. 3 is a perspective view of an inlet block for a mass flow controller having an inlet aperture and an inlet channel, with a restrictor placed in the inlet aperture.
Figure 4:
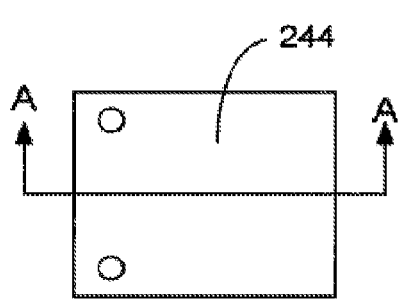
FIG. 4 is a top view of the inlet block of FIG. 3.
Figure 4A:
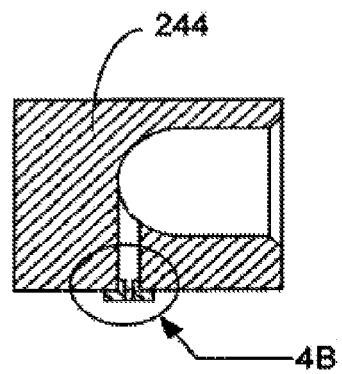
FIG. 4A is a side cross-section view of the inlet block of FIG. 3.
Figure 4B:
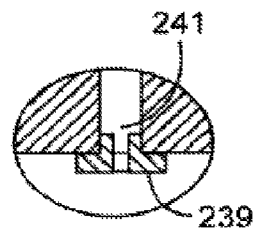
FIG. 4B is a detail, section view of the inlet aperture of the inlet block of FIG. 3.

For instance, FIGS. 3-4A, 6-7A, 9, and 9A illustrate examples of inlet blocks that are modified to include restrictor elements to reduce the flow perturbations when making a ROD measurement. Referring now to FIGS. 3-4B, a restrictor 239 is added to an otherwise typical inlet block 244 to reduce the effect of pressure rise at the end of the decay measurement. As referenced herein, "restrictor" refers to a structure or restrictive element that restricts or partially obstructs fluid flow. For example, a restrictor may be a fixed orifice having a smaller diameter to constrain flow through the orifice, an obstruction, a baffle, a filter, a filler material, a filler material, or a centered element that obstructs flow through the center of an aperture. Here, the restrictor 239 is an insert that narrows the diameter of the inlet aperture 241 to restrict flow into the inlet block 244 and to effectively form restrictive chambers within the inlet block 244. In an embodiment, the restrictor 239 may be formed integrally to the inlet block 244 from the same material by using, for example, a machining or bonding process to form a restrictive geometric feature or attach the restrictor, respectively, within the inlet aperture 241.

It is noted that the inlet block 244, in addition to the other examples of inlet blocks described herein may be formed from any suitable material and any suitable manufacturing technique. For example, an inlet block may be formed from a plastic, ceramic, or a metal, such as a stainless steel, a high-performance alloy, or a corrosion-resistant alloy. As referenced herein, a "high-performance alloy" refers to corrosion-resistant metal alloys marketed by Haynes International as Hastelloy®, wherein the predominant alloying ingredient is typically the transition metal nickel and other alloying ingredients are added to nickel in varying percentages, including some or all of the elements of molybdenum, chromium, cobalt, iron, copper, manganese, titanium, zirconium, aluminum, carbon, and tungsten. In addition, an inlet block may be formed from a combination of the forgoing elements. In each case, the material used to form the inlet block may be selected based on the operating conditions of the mass flow controller, taking into account such considerations as operating temperature, composition of gas or fluid, and flow rate. In addition, the inlet block may be formed from machining one or more components of the inlet block from one or more sold pieces of material, a molding of casting process, a sintering process, or even a lithographic manufacturing process.

Figure 5:
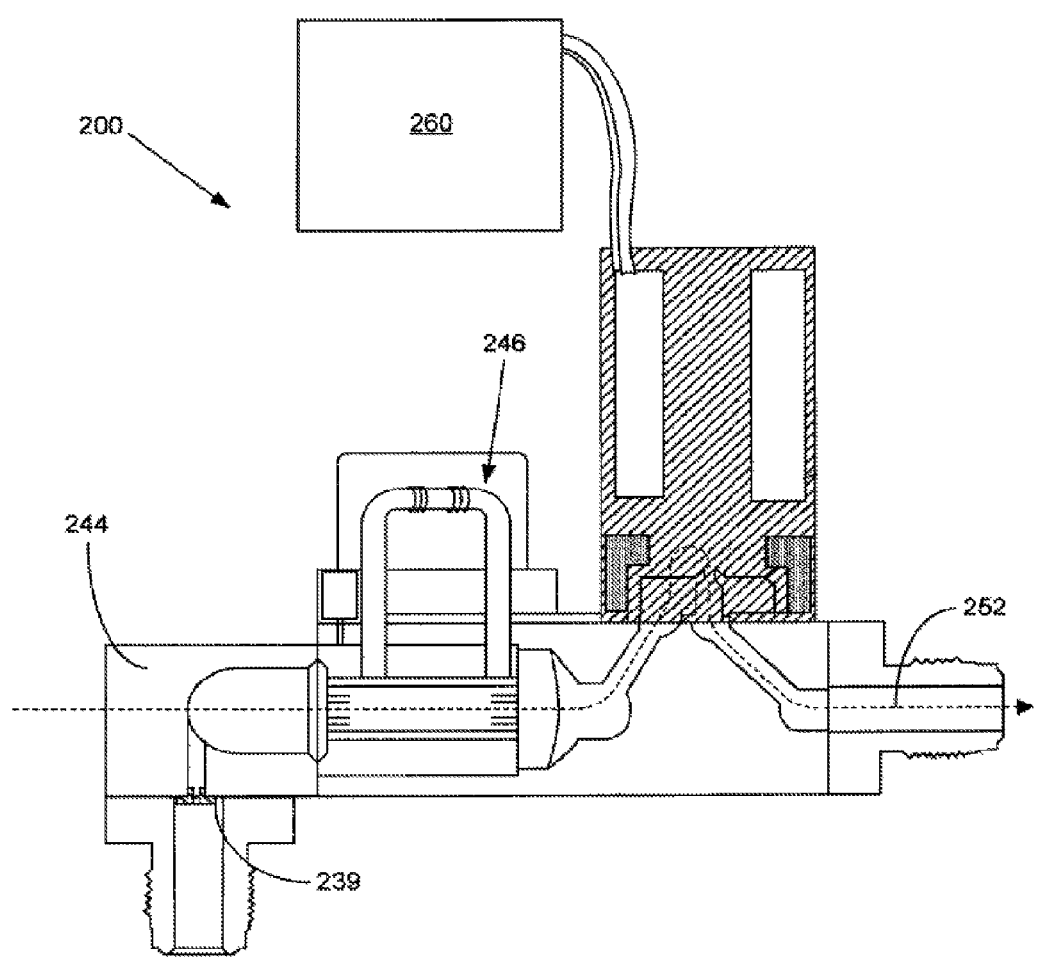
FIG. 5 is a schematic, section view of an embodiment of a mass flow controller that includes the inlet block of FIG. 3.

FIG. 5 shows the inlet block discussed above with regard to FIGS. 3-4A installed in a mass flow controller 200 that, aside from having a modified inlet block 244, is mostly similar to the mass flow controller 100 discussed above with regard to FIG. 1. As shown, the restrictive element is placed along the flow path 252 upstream from the thermal sensor 246 so that flow perturbations will be minimized at the thermal sensor 246, thereby improving the quality of the sensor signal data provided to the control subsystem 260 and enhancing the mass flow controller's ability to control flow over the duration of time in which the ROD measurement is made.

Figure 7:
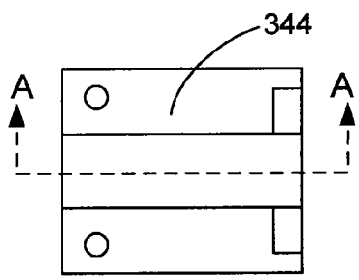
FIG. 7 is a top view of the inlet block of FIG. 6.
Figure 6:
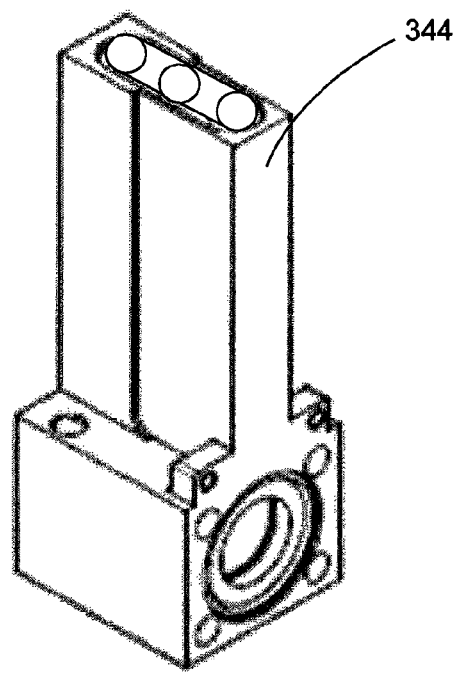
FIG. 6 illustrates an example of an inlet block that is modified to include a reservoir and restrictors placed along the flow path of the inlet block.
Figure 7A:
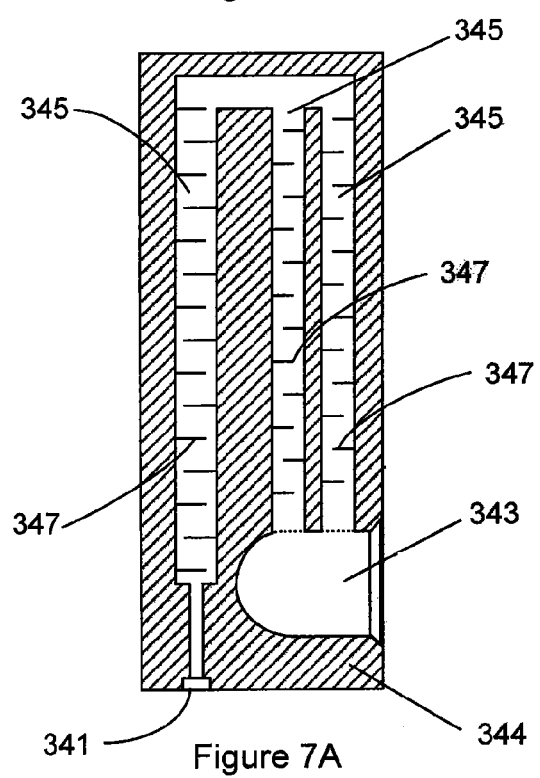
FIG. 7A is a side, section view of the inlet block of FIG. 6.
Figure 8:
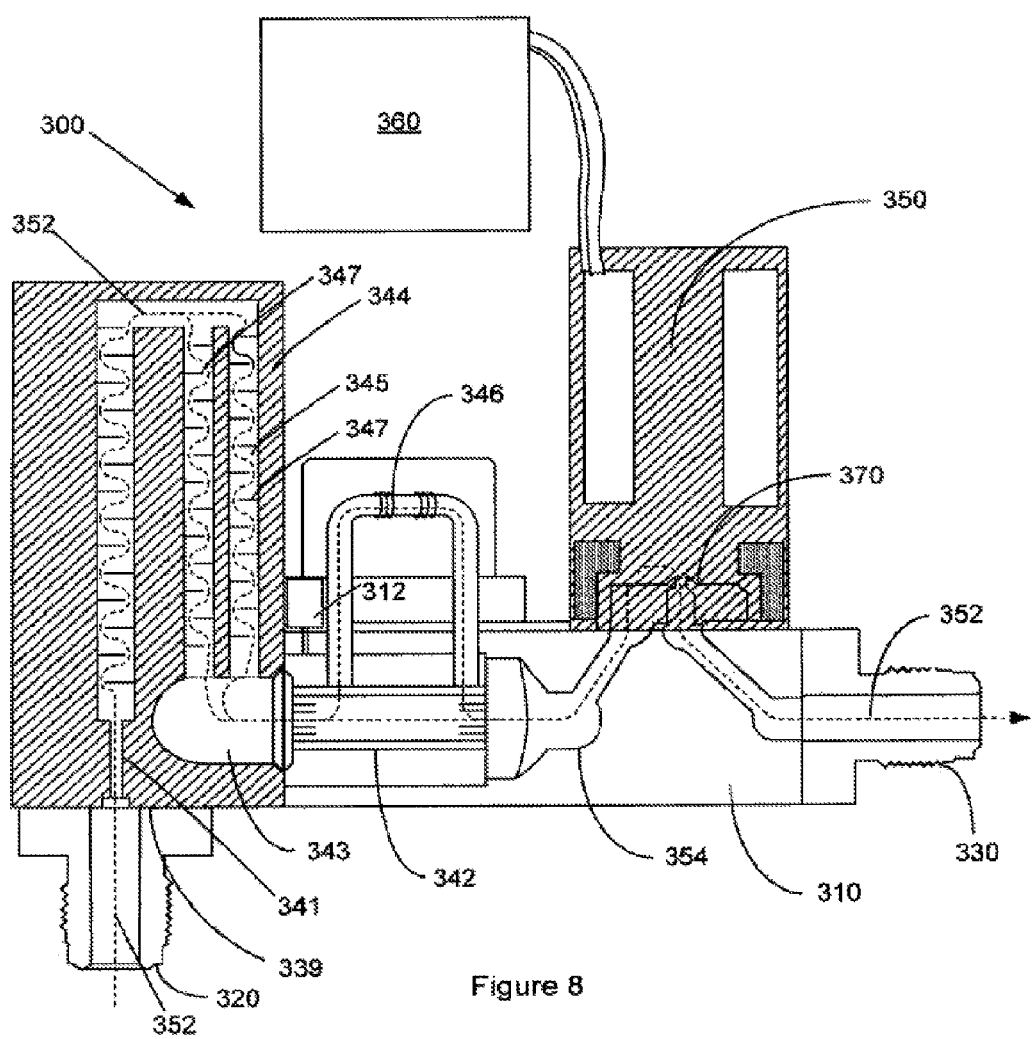
FIG. 8 is a schematic, section view of an embodiment of a mass flow controller that includes the inlet block of FIG. 6.

FIGS. 6-7A show an illustrative embodiment of a modified inlet block 344 having a reservoir 345, which is an enlarged internal volume that, in the embodiment of FIGS. 6-7A, includes one or more restrictors 347. The larger internal volume of the modified inlet block 344 helps to enable the mass flow controller to measure a higher flow rate than typically can be done using the inlet block depicted in FIG. 1, and may be one or more chambers that are separated from the inlet channel 343 by a segment of the flow path 352. The one or more restrictors 347 help reduce the effect of pressure rise at the end of the decay measurement when the upstream pressure is restored, thus, providing a more accurate ROD measurement. In the embodiment of FIGS. 6-7A, and as shown in FIG. 8, which illustrates a representative mass flow controller 300 that includes the modified inlet block 344, the modified inlet block includes both a reservoir 345 and restrictors 347. Here, the reservoir is show as a split fluid flow path 352 that passes into the inlet aperture 341 of the inlet block and through two tubular areas before entering the inlet channel 343 and exiting the inlet block. As shown, the restrictors may be staggered elements, such as baffles or other obstructions that modify the flow path through the inlet block. In the embodiment of FIG. 7A, the restrictors comprise staggered baffles that are located along the fluid flow path at a spaced interval.

FIGS. 9 and 9A show an inlet block 444 that is similar in most respects to the inlet block 344 discussed above with regard to FIGS. 6-8. In the embodiment of FIGS. 9 and 9A, however, the restrictors 447 are formed as narrowed apertures spaced along the flow path throughout the inlet block 444 to constrain or obstruct flow through the reservoir 445.

It should be noted that the various apertures and restrictive elements described in FIGS. 4, 5, 7-9 must be sized or tuned to meet the needs of the individual application. In particular, the inlet flow restrictor must be sized so as to (1) prevent the ROD recovery pressure pulse from generating an unacceptable sensor flow so that the flow sensor will not come near its saturation flow limit and (2) allow the mass flow controller to achieve its rated full scale flow with adequate control and response under normal operating pressures.

By of way example, one may have a mass flow controller without a bypass that is designed to have a maximum flow of 10 sccm $N_2$ under normal operating conditions of 35 psia inlet pressure, 14.7 psia outlet pressure, and an operating temperature of 25° C. In the example, the maximum allowable instantaneous flow that the sensor can tolerate without becoming saturated is assumed to be 30 sccm $N_2$ and it is assumed that a pressure drop of 5 psi is required to achieve a repeatability of <0.25% of rate when the device is flowing 10 sccm $N_2$.

In this example, the following calculations may be used to select and size an inlet restrictor having a diameter of 0.01 inches. The standard orifice equation for subsonic flow is applicable to this situation:

$$Q_{ref,inst} = \frac{C_d A}{\rho_{ref}} \sqrt{2\rho_{inlet}\left(\frac{k}{k-1}\right)\left[\left(\frac{P_{outlet}}{P_{inlet}}\right)^{\frac{2}{k}} - \left(\frac{P_{outlet}}{P_{inlet}}\right)^{\frac{k+1}{k}}\right]}$$ (Equation 2)

where:

$C_d$=Orifice discharge coefficient (typically ~0.7),

A=Orifice Area (7.854E-5 in^2), $\rho_{inlet}$=actual inlet gas density (2.728 kg/m^3), $P_{inlet}$=Pressure upstream of the orifice (35 psia), $P_{outlet}$ Pressure downstream of the orifice (30 psia), k=gas specific heat ratio (Cp/Cv)=1.4 for $N_2$, $\rho_{ref}$=the gas standard density (the density of an equivalent ideal gas at standard temperature and pressure (here, 1.251 kg/m³ for $N_2$) in accordance with SEMI Specification E12-96, and $Q_{ref,inst}$=the instantaneous gas volumetric flow rate through the orifice due to the ROD pressure recovery transient at standard density (the density of an equivalent ideal gas at standard temperature and pressure) in accordance with SEMI Specification E12-96 and all other variables have been previously defined.

The fluid inertia will be ignored which means that the instantaneous flow rate into the chamber can be calculated via the sub-sonic flow equation described in Equation 2 above. The mass that flows through the flow sensor tube as a result of the changing pressure will be proportional to the volume between the sensor tube exit and the valve and the total inlet volume upstream of the valve exit and the instantaneous flow rate per the Amagat-Leduc Law of partial volumes. For example, $$Q_{ref,transient\_sensor} = Q_{ref,inst} \frac{V_{Dead}}{V_{MFC}} \quad \text{(Equation 3)}$$

where:

$Q_{ref, transient\_sensor}$=transient sensor flow at the standard reference density, $V_{Dead}$=volume between sensor tube outlet and valve orifice (dead volume=0.0501 cm³), and $V_{MFC}$=total mass flow controller internal volume upstream of the valve orifice (4.98 cm³). As referenced herein, the inlet volume is understood to include the volume of the flow path, or conduit, between the upstream isolation valve and the pressure sensor, including the reservoir 445 of the inlet block 444. In principle, the true decay volume includes an additional volume external to the mass flow controller that includes the volume between the upstream isolation shutoff valve and the mass flow controller inlet block. Ignoring this additional volume results in a small overestimate of the transient sensor flow and is therefore calculations that ignore the additional volume yield a conservative result.

Here, the maximum possible total flow through the sensor will be the normal maximum sensor flow plus the transient sensor flow:

$$Q_{ref,total} = Q_{ref,transient\_sensor} + Q_{ref,operating\_sensor} \quad \text{(Equation 4)},$$

where:

$Q_{ref,total}$=total flow through the sensor at the standard reference density, and $Q_{ref,operating\_sensor}$=maximum normal operating sensor flow (10 sccm) at the standard reference density.

For this specific example, Equation 2 yields a value of 668 sccm, Equation 3 yields a value of 6.71 sccm, and Equation 4 yields a specific value of 16.71 sccm, which is well below the specific sensor saturation flow limit of 30 sccm. A check must now be made to ensure that the inlet aperture orifice does not significantly impact operation of the mass flow controller control valve during normal controller operation. This is accomplished by solving Equation 2 for the outlet pressure when the sensor flow is 10 sccm (maximum normal operating flow) with an inlet pressure of 35 psia. Such a calculation reveals that the pressure drop through the inlet orifice is less than 0.05 psi—which is well below the control band of most commercial pressure regulators.

It should be recognized that the example above is for illustrative purposes only and is intended only to show the basic sizing approach. In more complicated situations, such as multiple inlet aperture orifices and a multi-tube bypass in parallel with the sensor tube, more involved calculations must be made. However, such calculations may be accomplished using a computing tool such as Matlab, Mathcad, or even Excel.

Similar to FIG. 2, FIG. 10 is a graph illustrating example flow and pressure responses when the pressure is restored to a mass flow controller utilizing an inlet block having one or more restrictors after a ROD measurement. In FIG. 10, a first trend line 490 tracks the pressure over time to indicate the rate of pressure drop during a rate of decay measurement. Over the same time period, a second trend line 492 tracks the change in flow through the mass flow meter. FIG. 10 shows that even though the pressure rapidly turns to a baseline of 30 psi at a time of approximately 6.87 seconds, only a minimal flow perturbation 494 is measured. Here, the pressure perturbations are reduced due to the restrictors in the inlet block that enable the mass flow controller to limit the flow perturbation to a very small amount (typically less than 1% of setpoint) potentially one or two orders of magnitude better than shown in FIG. 2.

A method of manufacturing a mass flow controller 300, such as the mass flow controller 300 shown in FIG. 8, is also provided. The method includes providing a block 310 to secure components of the mass flow controller and forming at least one conduit 354 comprising a fluid inlet 320 and a fluid outlet 330 to define a fluid flow path 330. The method also includes providing a modified inlet block 344 comprising an inlet aperture 341, an inlet channel 343 fluidly coupled to the fluid inlet 320, and one or more restrictors 347 may be included in a reservoir 345 or inlet aperture 341 of the inlet block. In addition, the method includes providing at least one flow sensor 346 and one pressure sensor that generate a flow sensor signal proportional to the mass flow rate of fluid through the conduit 354 and a pressure sensor signal that is indicative of the pressure in the conduit, respectively. In an embodiment, the at least one flow sensor 346 and pressure sensor 312 are coupled to a control subsystem 360 that is operable to receive the flow sensor signal and pressure sensor signal to generate a flow sensor based mass flow rate for the fluid and a pressure measurement. The method also includes coupling a valve assembly 350 to the block 310 along the fluid flow path 352 and establishing a communicative coupling between the control subsystem 360 and the valve assembly 350, wherein the control subsystem 360 is operable to control the valve assembly 350 to adjust the rate of fluid through the conduit 354.

According to an illustrative embodiment, the step of providing an inlet block 344 having the inlet aperture 341, an inlet channel 343 fluidly coupled to the inlet aperture 341, and a reservoir 345 fluidly coupled to the inlet channel 343 may include providing an inlet block 344. In an embodiment, providing an inlet block 344 comprising the inlet aperture 341, an inlet channel 343 fluidly coupled to the inlet aperture 341, and a reservoir 345 fluidly coupled to the inlet channel 343 may comprise providing an inlet block 344 having a reservoir 345 that extends the flow path through the inlet box and includes one or more restrictors.

Accordingly, as described above, advantages of the disclosed embodiments include, but are not limited to, improving a mass flow controller by modifying an inlet block of a mass flow controller to reduce the flow perturbations when making the ROD measurement.

While specific details about the above embodiments have been described, the above description is intended merely as an example embodiment and is not intended to limit the structure or implementation of the disclosed embodiments. For instance, it should be noted that the volume does not necessarily need to be made as large as physically possible. For example, for the lowest flow rates, too large of a volume will cause the measurement time to increase undesirably too long due to the increase in run time that is required for the pressure to decay with a very low flow. Further, it is noted that while the concepts described herein are described with regard to a mass flow controller, they may be applied in similar systems that include analogous elements. For example, instead of including a restrictors within an inlet block of a mass flow controller, a user may install a component having restrictors, such as those described with regard to FIGS. 6-9A, upstream of a flow sensor in a control system. In addition, a mass flow meter, or volume flow meter, may be assembled with the elements described above to create a system having comparable functionality to the mass flow controller systems described herein and having a modified inlet block or other inlet volume that includes restrictors.

Those skilled in the art will recognize that the present teachings are amenable to a variety of modifications and/or enhancements. While the foregoing has described what is considered to be the best mode and/or other examples, it is understood that various modifications may be made therein and that the subject matter disclosed herein may be implemented in various forms and examples, and that the teachings may be applied in numerous applications, only some of which have been described herein. Such modifications are intended to be covered within the true scope of the present teachings.

What is claimed:

1. A system for determining a flow rate of a compressible fluid, comprising:
   at least one conduit comprising a fluid inlet and a fluid outlet, the conduit defining a flow path along which the fluid flows;
   an inlet block comprising an inlet aperture, one or more restrictors coupled to the inlet aperture, and an inlet channel fluidly coupled to the conduit, wherein the one or more restrictors are sized and configured to prevent pressure perturbations of a magnitude that will interfere with the performance of a flow sensor when fluid flow into the system resumes after a rate of decay measurement, and wherein the one or more restrictors comprise a restrictive element disposed within the inlet aperture; and
   at least one pressure sensor that generates a pressure sensor signal, which is indicative of the pressure of the fluid through the conduit, the at least one pressure sensor being coupled to a controller that is operable to generate a pressure sensor based pressure measurement for the fluid, wherein the flow sensor generates a flow sensor signal that is proportional to a mass flow rate of the fluid through the conduit, the at least one flow sensor being coupled to the controller, the controller is configured to generate a flow sensor based mass flow rate for the fluid, the flow sensor based mass flow rate being determined at least in part from the flow sensor signal.

2. The system for determining a flow rate of a compressible fluid of claim 1, wherein the restrictive element comprises a geometric feature of the inlet aperture.

3. The system for determining a flow rate of a compressible fluid of claim 1, wherein the inlet block comprises a reservoir disposed along the flow path, the reservoir being disposed downstream from the inlet aperture and upstream from the inlet channel.

4. The system for determining a flow rate of a compressible fluid of claim 3, wherein the one or more restrictors further comprises one or more restrictive elements disposed within the reservoir.

5. The system for determining a flow rate of a compressible fluid of claim 4, wherein the reservoir comprises one or more chambers, and the one or more restrictive elements comprise one or more apertures arranged within the one or more chambers.

6. The system for determining a flow rate of a compressible fluid of claim 4, wherein the one or more restrictive elements comprises one or more baffles.

7. The system for determining a flow rate of a compressible fluid of claim 6, wherein the one or more baffles comprises a plurality of baffles that are staggered along the flow path.

8. A method of manufacturing a system for monitoring flow, the method comprising:
   providing a block to secure components of the system;
   forming at least one conduit comprising a fluid inlet and a fluid outlet to define a fluid flow path;
   providing at least one flow sensor that generates a flow sensor signal proportional to the mass flow rate of fluid through the conduit;
   providing at least one pressure sensor operable to generates a pressure sensor signal indicative of the pressure in the conduit;
   providing an inlet block comprising an inlet aperture, one or more restrictors, and an inlet channel fluidly coupled to the conduit, wherein the one or more restrictors are sized and configured to prevent pressure perturbations of a magnitude that will interfere with the performance of a flow sensor when fluid flow into the system resumes after a rate of decay measurement, and wherein the one or more restrictors are located at the inlet aperture;
   coupling the at least one flow sensor to a control subsystem that is operable to receive the flow sensor signal and generate a flow sensor based mass flow rate for the fluid;
   coupling the at least one pressure sensor to the control system, the control system being operable to receive the pressure sensor signal to generate a pressure measurement; and
   coupling a valve assembly to the block and establishing a communicative coupling between the control subsystem and the valve body, wherein the control subsystem is operable to control the valve assembly to adjust the rate of fluid through the conduit.

9. The method of claim 8, wherein the inlet aperture includes a plurality of restrictors.

10. The method of claim 8, wherein the inlet block further comprises a reservoir disposed along the flow path between the inlet aperture and the inlet channel, and wherein the reservoir comprises one or more further restrictors.

11. A mass flow controller, comprising:
at least one conduit comprising a fluid inlet and a fluid outlet, the conduit defining a flow path along which a fluid flows;
at least one flow sensor that generates a flow sensor signal that is proportional to a mass flow rate of the fluid through the conduit, the at least one flow sensor being coupled to a controller that is operable to generate a flow sensor based mass flow rate for the fluid, the flow sensor based mass flow rate being determined at least in part from the flow sensor signal;
an inlet block comprising an inlet aperture, an inlet channel fluidly coupled to the conduit, and one or more restrictors positioned along the flow path between the inlet aperture and inlet channel, wherein the one or more restrictors are sized and configured to prevent pressure perturbations of a magnitude that will interrupt the performance of the at least one flow sensor when fluid flow into the system resumes after a rate of decay measurement, and wherein the one or more restrictors comprise a restrictive element disposed within the inlet aperture;
at least one pressure sensor that generates a pressure sensor signal, which is indicative of the pressure of the fluid through the conduit, the at least one pressure sensor being coupled to a controller that is operable to generate a pressure sensor based pressure measurement for the fluid;
a control subsystem coupled to the at least one flow sensor; and
a valve assembly communicatively coupled to the control subsystem and operable to adjust the rate of fluid through the conduit.

12. The mass flow controller of claim 11, wherein the restrictive element comprises an insert that is bonded to the inlet aperture.

13. The mass flow controller of claim 12, wherein the inlet block comprises a reservoir disposed along the flow path, the reservoir being disposed along the flow path between the inlet aperture and the inlet channel.

14. The mass flow controller of claim 11, wherein the inlet block comprises a reservoir disposed along the flow path, the reservoir being disposed along the flow path between the inlet aperture and the inlet channel.

15. The mass flow controller of claim 14, wherein the reservoir comprises one or more chambers having further restrictive elements comprising one or more restrictive apertures arranged within the one or more chambers.

16. The mass flow controller of claim 14, wherein the reservoir comprises one or more chambers having further restrictive elements comprising a series of staggered baffles.

17. The mass flow controller of claim 11, wherein the body of the inlet block is formed from a material selected from the group consisting of stainless steel, high performance alloy, a ceramic, and a plastic.

* * * * *